United States Patent
Probst

Patent Number: 6,061,622
Date of Patent: May 9, 2000

[54] CIRCUIT CONFIGURATION FOR CONTROLLING TORQUE TRANSMITTED BETWEEN DRIVEN WHEELS OF A MOTOR VEHICLE AND A ROADWAY

[75] Inventor: Gregor Probst, Landshut, Germany

[73] Assignee: Siemens Aktiengesellschaft, Munich, Germany

[21] Appl. No.: 08/681,902

[22] Filed: Jul. 29, 1996

[30] Foreign Application Priority Data

Jul. 28, 1995 [DE] Germany ............... 195 27 840

[51] Int. Cl.[7] ............................................. B60K 28/16
[52] U.S. Cl. .............................. 701/84; 701/90; 180/197
[58] Field of Search .................................. 701/82, 84, 85, 701/86, 87, 90; 180/197

[56] References Cited

U.S. PATENT DOCUMENTS

| | | | |
|---|---|---|---|
| 4,763,262 | 8/1988 | Leiber ........................... | 701/90 |
| 4,985,838 | 1/1991 | Hashiguchi et al. ........... | 701/90 |
| 5,090,511 | 2/1992 | Kabasin ......................... | 701/85 |
| 5,107,429 | 4/1992 | Sol ................................. | 701/85 |
| 5,283,742 | 2/1994 | Wazaki et al. ................. | 701/86 |
| 5,293,315 | 3/1994 | Kolbe et al. ................... | 701/90 |
| 5,369,586 | 11/1994 | Bridgens ........................ | 701/86 |
| 5,504,680 | 4/1996 | Yamashita et al. ............ | 701/90 |
| 5,636,909 | 6/1997 | Hirao et al. .................... | 701/84 |
| 5,737,714 | 4/1998 | Matsuno et al. ............... | 701/90 |

FOREIGN PATENT DOCUMENTS

| | | |
|---|---|---|
| 0 294 634 B1 | 4/1994 | European Pat. Off. . |
| 1 806 671 | 7/1970 | Germany . |
| 34 17 423 A1 | 11/1985 | Germany . |
| 4129984 A1 | 3/1993 | Germany . |
| 4308903 A1 | 9/1994 | Germany . |
| 43 44 634 A1 | 7/1995 | Germany . |

*Primary Examiner*—Gary Chin
*Attorney, Agent, or Firm*—Herbert L. Lerner; Laurence A. Greenberg

[57] ABSTRACT

A circuit configuration for controlling engine torque transmitted to a roadway through driven wheels of a motor vehicle includes a device for wheel-selective slip value detection and for determining a representative wheel slip, a device for specifying a set-point slip, and an engine controller that takes a slip status into account. The engine controller is preceded by a regulator, to which a difference between the set-point slip and the representative wheel slip is supplied as a control difference. A feedback signal characterizing the current engine torque is sent from the engine controller to the regulator.

4 Claims, 4 Drawing Sheets

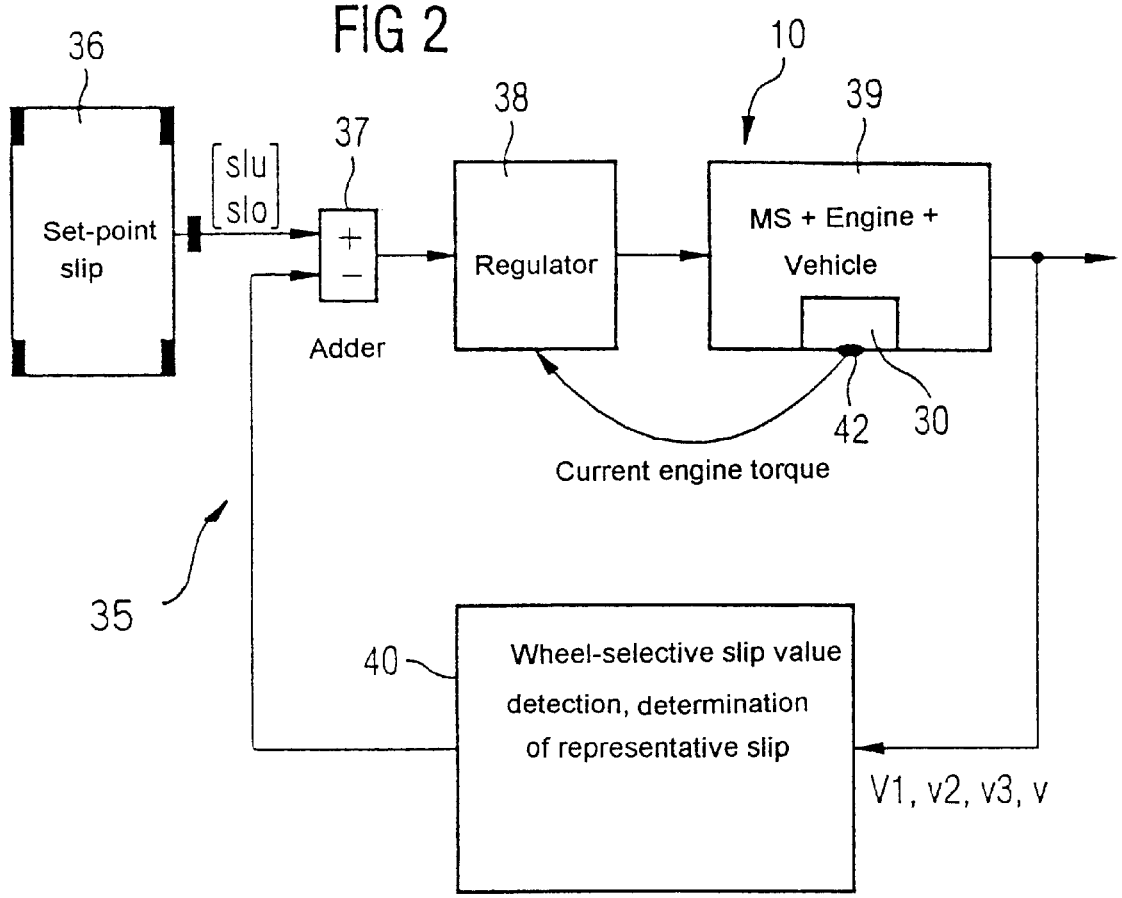
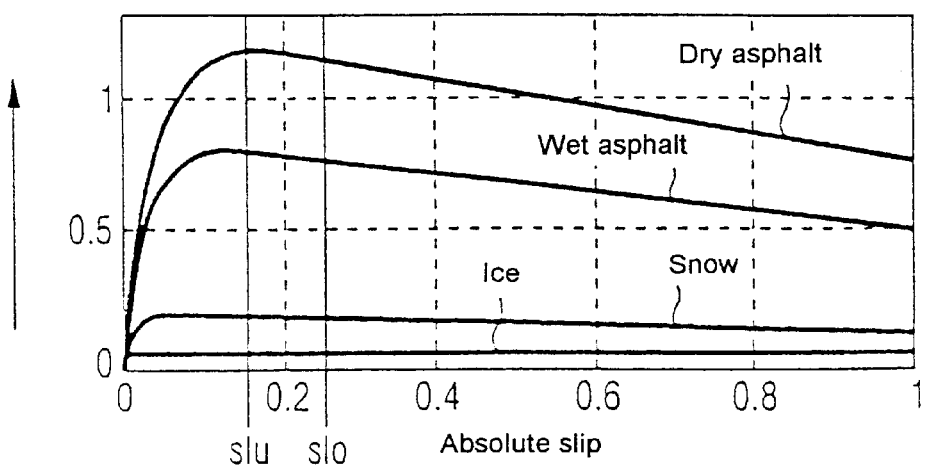

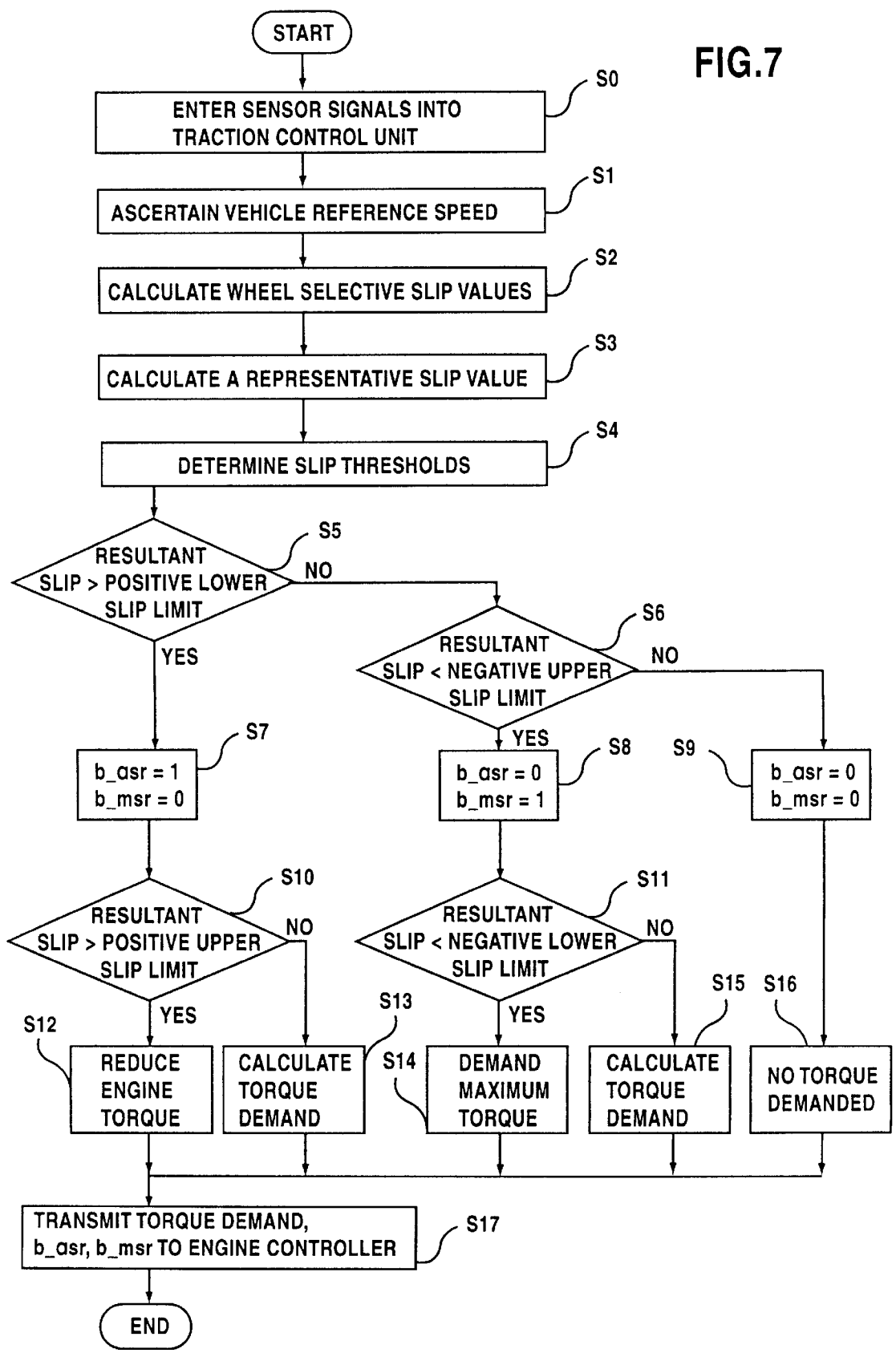

CIRCUIT CONFIGURATION FOR CONTROLLING TORQUE TRANSMITTED BETWEEN DRIVEN WHEELS OF A MOTOR VEHICLE AND A ROADWAY

BACKGROUND OF THE INVENTION

FIELD OF THE INVENTION

The invention relates to a circuit configuration for controlling torque transmitted between driven wheels of a motor vehicle and a roadway, having a device for wheel-selective slip value detection and for determining a representative wheel slip, a device for specifying a set-point slip, and an engine controller taking a slip status into account.

Such a circuit configuration is used to regulate the engine torque that is transmitted through the drive train of the motor vehicle to the driven wheels. A certain slip is known to be necessary between the wheels and the roadway, so that the drive forces can be best transmitted to the road. If the slip becomes excessive, unstable driving states as well as increased tire wear can result. For example, if the driver of a rear wheel drive vehicle passes a slower vehicle in front of him or her on a long curve leading out of town, and if the street in town is wet but the road outside town is slippery because of temperature and weather conditions, and if to that end he or she steers his or her vehicle to the opposite lane and steps hard on the gas so as to pass quickly, the danger is that the vehicle will spin out and end up on the shoulder.

Therefore, particularly in high-performance motor vehicles, the engine or drive torque transmitted to the roadway through the driven wheels is expediently controlled in such a way that the slip status of the driven wheels is taken into account. One device for controlling the slip of drive wheels of a vehicle with an engine, which is known from European Patent Specification 0 294 634 B1, has a fuel delivery device for the engine, first and second slip detecting devices, a fuel delivery interruption device, a parameter detecting device and a fuel quantity correction device. It distinguishes between an excessive slip status, in which the fuel delivery is interrupted, and a lesser slip status, in which the fuel delivery is corrected as a function of an operating parameter, such as the engine rpm. The requisite expenditure for circuitry and programming is not inconsiderable.

SUMMARY OF THE INVENTION

It is accordingly an object of the invention to provide a circuit configuration for controlling torque transmitted between driven wheels of a motor vehicle and a roadway, which overcomes the hereinafore-mentioned disadvantages of the heretofore-known devices of this general type and with which effective control of the engine torque transmitted to the roadway is made possible at little expense and with adaptation to an existing slip status.

With the foregoing and other objects in view there is provided, in accordance with the invention, a circuit configuration for controlling torque transmitted between driven wheels of a motor vehicle and a roadway, comprising a device for wheel-selective slip value detection and for determining a representative wheel slip; a device for specifying a set-point slip; an engine controller taking a slip status into account; a regulator connected upstream of the engine controller and receiving a difference between the set-point slip and the representative wheel slip as a control difference; and the engine controller having an output from which a feedback signal characterizing a current engine torque is sent to the regulator.

In accordance with another feature of the invention, an engine torque is ascertained by calculating a gain factor for the current engine torque as a function of the representative wheel slip furnished by the device for wheel-selective slip value detection and for determining a representative wheel slip.

In accordance with a further feature of the invention, vehicle parameters of the motor vehicle being ascertained continuously by model calculation are taken into account in the determination of the representative wheel slip for each wheel.

In accordance with a concomitant feature of the invention, the device for specifying a set-point slip determines and shifts a lower and an upper slip threshold as a function of vehicle status variables.

Other features which are considered as characteristic for the invention are set forth in the appended claims.

Although the invention is illustrated and described herein as embodied in a circuit configuration for controlling torque transmitted between driven wheels of a motor vehicle and a roadway, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block diagram of the circuit configuration of the invention in the motor vehicle of FIG. 1;

FIG. 3 is a graph showing a coefficient of adhesion between a wheel and the roadway in the longitudinal direction of the vehicle, plotted over an absolute slip in traction control;

FIG. 7 is a flowchart of a control program performed by the circuit configuration of FIG. 2.

DESCRIPTION OF THE PREFERRED EMBODIMENTS

Figure 1:
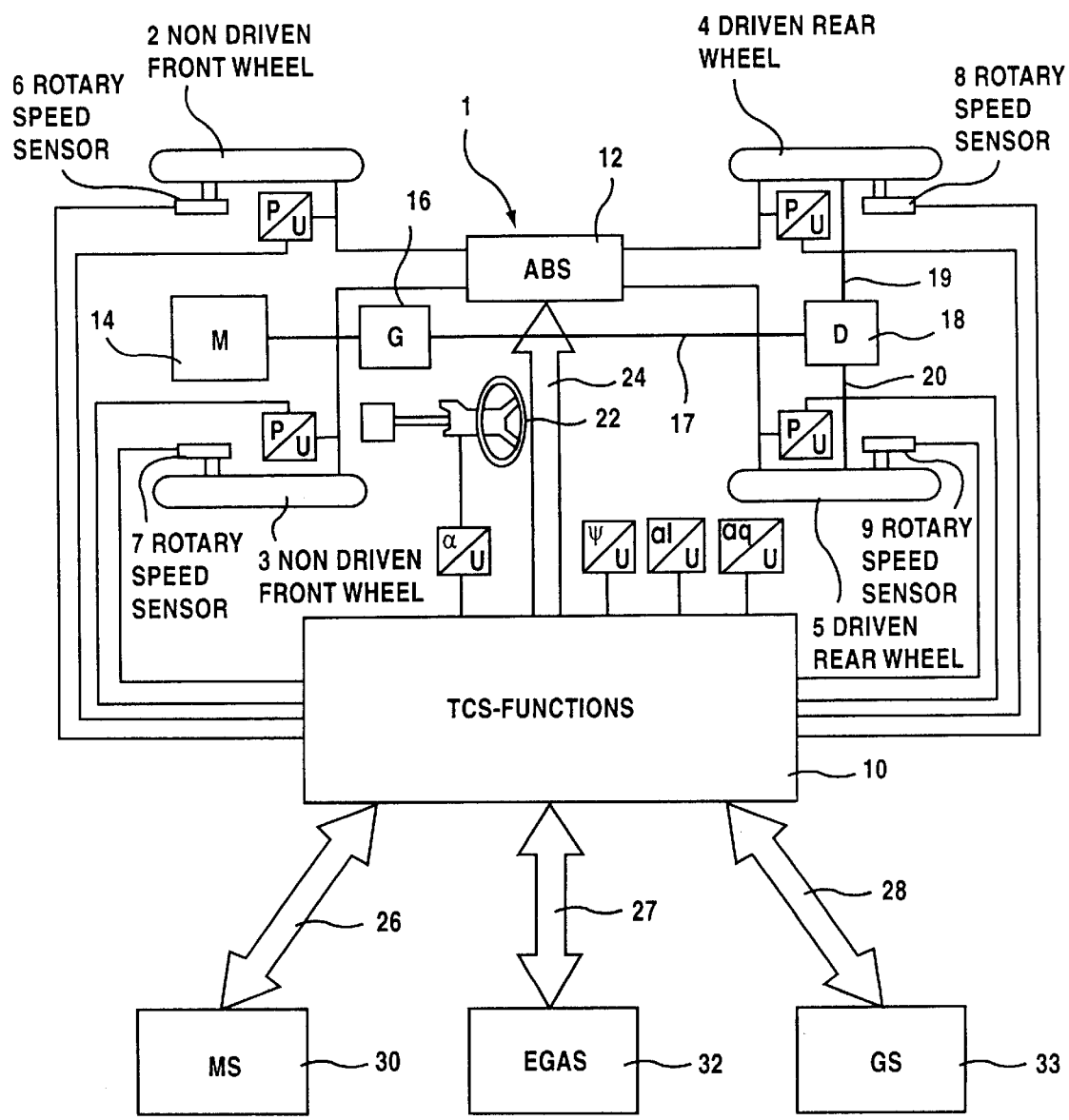
FIG. 1 is a diagrammatic view of a motor vehicle equipped with a circuit configuration according to the invention shown in a block diagram for controlling torque transmitted between driven wheels of the motor vehicle and a roadway.

Referring now to the figures of the drawings in detail and first, particularly, to FIG. 1 thereof, there is seen a diagrammatically illustrated motor vehicle 1 which has two front, nondriven wheels 2, 3 and two rear, driven wheels 4, 5. Rotary speed sensors 6–9 that are assigned to these wheels detect wheel speeds and furnish corresponding rpm signals to a circuit configuration 10, which is also referred to below as a traction control unit 10, for controlling engine torque transmitted through the driven wheels of the motor vehicle to a roadway. The invention is naturally applicable to motor vehicles with front wheel drive or all-wheel drive as well.

Upon braking, an ABS (anti-lock brake system) control unit 12 that is known per se regulates brake pressure to the various wheels in such a way that a maximum possible braking action is attained yet the motor vehicle remains steerable during braking. The brake pressure exerted by the driver through a brake pedal acts upon the brakes as usual through a brake booster or brake controller. These brake actuation elements are not shown in the drawing, because they are well known.

Pressure sensors P/U associated with the wheels 2–5 detect the wheel brake pressures and furnish signals accordingly to the traction control unit 10. The signals or measurement values furnished by the sensors 6–9 are also transmitted over signal lines shown in the drawing to the traction control unit 10.

If there are no such brake pressure sensors, then the brake pressure can be ascertained on an ongoing basis by the ABS control unit 12 in a known manner through model calculation.

A drive train which connects an engine 14 to the wheels 4 and 5 includes a non-illustrated clutch, a transmission 16, a cardan shaft 17, a differential 18 and two axle shafts 19 and 20.

The traction control unit 10 also receives signals of the following sensors: a yawing speed sensor Ψ/U, a longitudinal acceleration sensor al/U, a transverse acceleration sensor aq/U, and a steering wheel angle sensor α/U, which detects a rotary angle of a steering wheel 22. The traction control unit 10 is connected to the ABS control unit 12 by a multiple data line or bus 24 over which data and control signals are transmitted. The traction control unit 10 is also connected over data lines or buses 26, 27 and 28 with an engine controller (MS) 30, an electronic engine performance controller (also known as an electronic gas pedal or EGAS) 32, and optionally a transmission controller (GS) 33.

FIG. 2 shows a circuit configuration 35 for controlling engine torque transmitted to the roadway through the driven wheels of the motor vehicle, which includes the following elements: a device 36 for specifying desired or set-point slip values, an adder element 37, a regulator 38, a modified controlled system 39 which includes the engine controller 30, the engine 14 as well as the vehicle drive or drive train (transmission, articulated shaft, differential, axle shafts and wheels) of FIG. 1, and a device 40 for wheel selective detection of the slip value and for determining a representative wheel slip $s_{repr}$. When the term slip or slip value is used below, it always refers to the wheel slip, that is the slip between a (driven) vehicle wheel and the surface of the road. In the event that a different value is detected for the two driven wheels, the higher value is used as the representative wheel slip $s_{repr}$. The wheel slip of the driven wheels is calculated in a known manner as a standardized difference between its speed or rpm $V_4$ or $V_5$ and an average value of the speeds or rpm values $V_1$ and $V_2$ of the nondriven wheels.

The controlled variable of the circuit configuration 35 is actually the engine torque transmitted by the wheels to the roadway, but this affects the wheel speeds $V_1$, $V_2$, $V_3$ and $V_4$. They are transmitted from an output of the controlled system 39 to an input of the device 40. The output signal of this device, that is the representative slip $s_{repr}$, is supplied with the opposite sign to the adder element 37 and is thus subtracted therein from the set-point slip value. The result is supplied to the regulator 38 as a controlling variable.

A (feedback) signal characterizing the current engine torque is returned from one output 42 of the modified controlled system 39 to the regulator 38. The current engine torque can be subdivided into an engine friction moment and an induced engine moment.

The traction slip is regulated by an engine intervention through the use of the circuit configuration 35. It is known that the engine torque can be reduced by reducing the ignition angle or adjusting the ignition timing toward late, by turning off the injection valves or by a combination of the two interventions. Moreover, the engine torque acting on the drive train can be reduced by a transmission intervention, by wheelselective braking, or by closing an electrical throttle valve. In this case the reduction of the drive moment is effected through an engine intervention. The drive moment is controlled by the slip control to be described below.

The coefficient of adhesion or coefficient of friction between a vehicle tire and the roadway surface is determined by the following formula, which indicates the relationship between an axle load and a drive force or deceleration force:

$$\mu(s(\alpha))=F_x/F_z$$

in which:

$\mu$=the coefficient of adhesion s=the wheel slip

α=the wheel inclination angle $F_z$=the axle load $F_x$=the wheel force in the longitudinal direction of the wheel.

Figure 5:
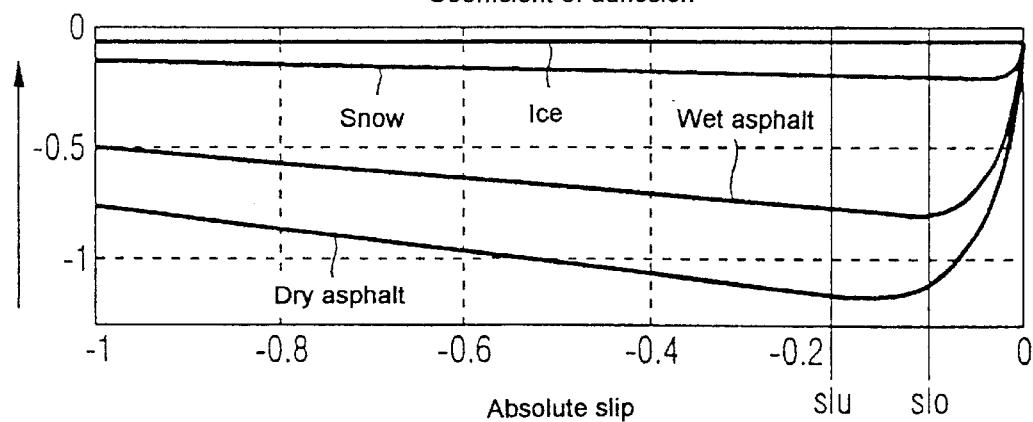
FIG. 5 is a graph showing a coefficient of adhesion between a wheel and the roadway in the transverse direction of the vehicle over an absolute slip in slip-dependent engine drag moment control.

FIGS. 3 and 5 show theoretical coefficients of adhesion in a direction longitudinally to the tire plane, i.e., longitudinally of the vehicle, which are plotted over the wheel slip, specifically in traction control (ASR) in FIG. 3 and in slip-dependent engine drag moment control (MSR) in FIG. 5. These coefficients of adhesion apply to a fixed angle of wheel inclination of 10° and to different road surface properties (dry asphalt, wet asphalt, snow and ice).

The coefficient of adhesion in the longitudinal vehicle direction is decisive for good traction, while the coefficient of adhesion in the transverse vehicle direction (which is not shown herein because it is known) is decisive for cornering force behavior and good steerability of the vehicle. In general, good traction is gained at the expense of good steerability, and vice versa.

However, a measurement of the real tire characteristics and a comparison with the theoretical tire characteristics exhibits major deviations. The real tire characteristic would have to be detected in the vehicle "on line" and with knowledge of the current road surface, in real time, to enable regulating the drive moment to the maximum traction or maximum steerability of the vehicle. However, such regulation is extensive in terms of program expenditure and computation capacity, because detecting the coefficient of adhesion requires detecting the aforementioned physical variables which, however, would require additional sensors. According to the invention, slip control is therefore carried out rather than control of the coefficient of adhesion.

Depending on the particular driving situation involved, an upper limit slo and a lower limit slu of the set-point wheel slip are specified. The regulator 38 receives the currently output engine torque from the vehicle drive 39. The engine torque affects the wheel speed, through the coupling between the drive train and the road surface. A wheel-selective slip for each wheel is calculated in a known manner from the four wheel speeds $V_1$ through $V_4$ that are measured.

The engine torque value received by the regulator 38 is calculated in the engine controller 30 in the known manner from the measured air flow rate, the engine rpm, and other engine variables.

The coefficient of adhesion curve seen in FIGS. 3 and 5 can be divided into three ranges, depending on the wheel slip:

| No.: | Range | Absolute slip |
|---|---|---|
| 1 | Stable range | 0 . . . 0.10 |
| 2 | Control range | 0.10 . . . 0.25 |
| 3 | Unstable range | 0.25 . . . 1.0 |

Figure 4:
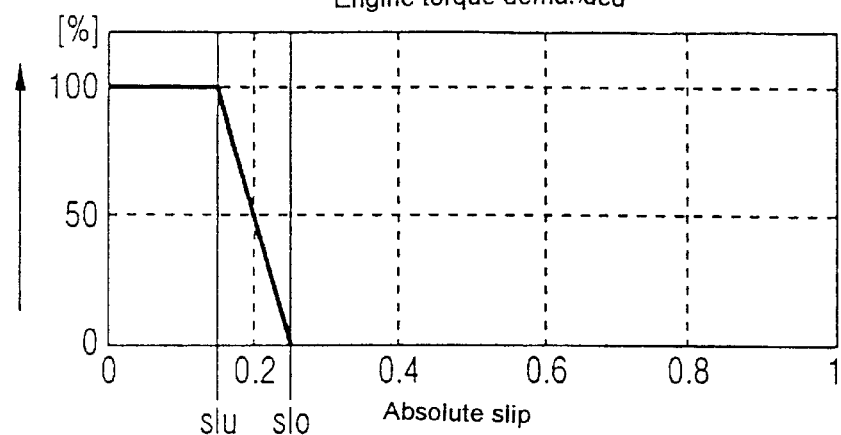
FIG. 4 is a graph showing engine torque demanded by the circuit configuration of FIG. 2 in traction control.

In the stable range the engine torque remains unlimited, in the control range the current engine torque is regulated downward linearly, and in the unstable range the engine torque is eliminated entirely. The engine torque which is thus demanded by the circuit configuration 35 is shown in FIG. 4 for the ASR mode, that is for traction control, and in FIG. 6 for the MSR mode, that is for engine drag moment control while the engine is braking. The engine torque is ascertained in the traction control unit 10 as a function of the representative wheel slip $s_{repr}$ furnished by the device 40, specifically by calculation of a gain factor V for the current engine torque $M_{mot}$:

$$M_{mot} = V \cdot s_{repr}$$

Figure 6:
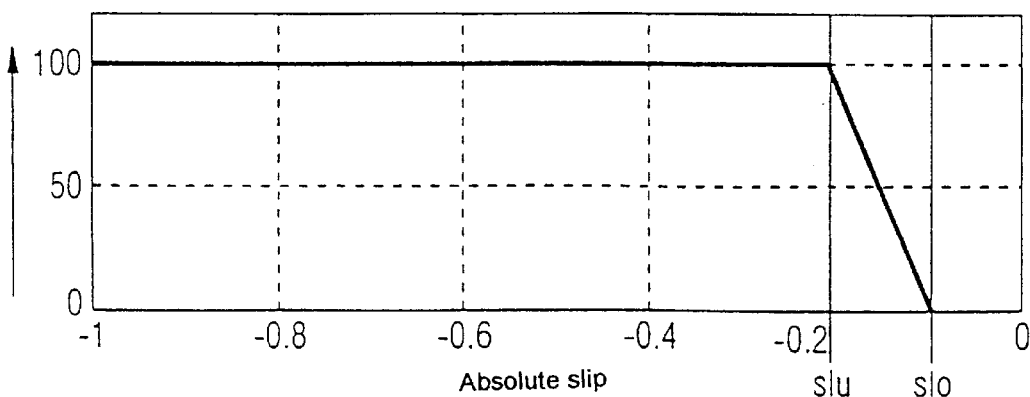
FIG. 6 is a graph showing engine torque demanded by the circuit configuration of FIG. 2 in slip-dependent engine drag moment control.

The function may, for instance, be a straight line, a cosine line, or a hysteresis-like curve. The engine torque may assume values between 0 and 100% (FIGS. 4 and 6).

The status variables of the motor vehicle, or driving parameters, are ascertained continuously by model calculation which is known per se, and taken into account in the determination of a representative wheel slip $s_{repr}$ for each wheel.

The control of the engine torque for the sake of wheel slip control according to the invention is accomplished through the use of an electronic control unit contained in the traction control unit 10, for instance in the form of a microprocessor (which is well-known and therefore is not shown further), that cyclically runs through the program seen in FIG. 7 in the following steps:

In a step S0, the wheel speeds and other signals are entered from the sensors that are present in the motor vehicle.

Next, in a step S1, the vehicle reference speed is ascertained from the sensor signals. The wheel-selective slip values are calculated in a step S2.

The slip values of the two driven wheels are weighted in a step S3, and a representative slip value is calculated therefrom.

In a step S4, as noted, the following are determined:

| a positive upper slip threshold | slp_hp_o |
| a positive lower slip threshold | slp_hp_u |
| a negative upper slip threshold | slp_hn_o and |
| a negative lower slip threshold | slp_hn_u. |

If the resultant slip is greater than the positive lower slip limit, then in a step S5 a jump to a step S7 is made.

If the resultant slip is less than the upper negative slip limit, then in a step S6 a jump to a step S8 is made.

In the step S7, a bit $b_{13}$ asr is set, and a bit b_msr is set definitively to 0.

If the bit b_asr=1, an ASR mode is detected. In other words, the wheel slip at the driven axle is positive and is within the control range of the coefficient of adhesion characteristic curve.

If the bit b_msr=0, no MSR mode is detected. In other words, the wheel slip at the driven axle is not negative.

In the step S8 the bit b_asr is defined at 0 and the bit b_msr is set to 1. In other words, a negative wheel slip is detected at the driven axle.

In a step S9, if the resultant slip is not above the positive lower limit and is not below the negative lower limit, and the wheel slip is thus in the stable range in which regulation need not be done, the bits b_asr and b_msr are set definitively to 0.

In a step S10, the resultant slip is checked as to the positive upper slip limit. In a step S11, a check is performed as to whether or not the slip is below the negative lower slip limit.

In a step S12, if the slip is above the positive upper slip limit, a total reduction in the engine torque is demanded.

In a step S13: If the slip is between the positive lower slip limit and the positive upper slip limit, then the demanded engine torque is calculated with the following formula:

MD_IND_XXX=(MD_IND+MD_REIB)/ (slp_hp_o-slp_hp_u)* (slp_hp_o-slp_h)

In a step S14: If the slip is below the negative lower slip threshold, then the maximum engine torque is demanded (the sum of the currently induced engine torque and the current engine friction moment). In that case, the throttle valve is closed as a rule.

In a step S15: If the slip is between the negative lower slip limit and the negative upper slip limit, then the demanded engine torque is calculated with the following formula:

MD_IND_XXX=(MD_IND+MD_REIB)/ (slp_hn_u-slp_hn_o)*(slp_h-slp_hn_o)

In a step S16: If no intervention by the engine is expected, then an engine torque of zero is demanded.

In a step S17: The value for the demanded engine torque and the two bits b_asr, b_msr are finally transmitted to the engine controller.

In FIGS. 4 and 6, the lower slip threshold and the upper slip threshold for both regulation modes are designated in simplified fashion by the symbols slu and slo. In the positive case, that is in the ASR mode, slu=0.15 and slo=0.25 in the example shown. In the negative case, that is in the MSR mode, slu=-0.2 and slo=-0.1.

In summary, the circuit configuration of the invention can be described as follows. It serves to control the engine torque transmitted through the driven wheels of a motor vehicle to the roadway. It has a device 40 for wheel-selective slip value detection and for determining a representative wheel slip $s_{repr}$, a device 36 for specifying a set-point slip, and an engine controller 30 that takes the slip status into account. The engine controller is preceded by a regulator 38, to which the difference between the set-point slip and the representative wheel slip is supplied as a control difference. A feedback signal characterizing the current engine torque is sent by the engine controller 30 to the regulator 38.

In the above-described circuit configuration 35, the coefficient of adhesion is projected on the demanded engine torque, as can be seen from the relationship of FIGS. 3 and 4 on one hand and of FIGS. 5 and 6 on the other hand. The result is a very simple regulator structure and a very simple regulator program shown in FIG. 7.

In known drive control systems for motor vehicles, quite extensive calculations of air resistance, rolling resistance and climbing resistance must be made, taking manifold measurement variables and interfering factors such as slope, trailer load, added load, vehicle mass, moments of vehicle inertia, $c_w$ value, air density, acceleration resistance, and so forth, into account, which thus requires very complicated and expensive regulator programs. In contrast, such complicated calculations are unnecessary in the circuit configuration described herein.

I claim:

1. A circuit configuration for controlling torque transmitted between driven wheels of a motor vehicle and a roadway, comprising:

a device for wheel-selective slip value detection and for determining a representative wheel slip;

a device for specifying a set-point slip;

an engine controller for controlling the torque transmitted between said driven wheels and said roadway based on said representative wheel slip;

a regulator connected upstream of said engine controller receiving a difference between the set-point slip and the representative wheel slip as a control difference and providing an output signal to said engine controller; and said engine controller having an output from which a feedback signal characterizing a current engine torque is sent to said regulator for reducing the representative wheel slip.

2. The circuit configuration according to claim 1, wherein a demanded engine torque is ascertained by calculating a gain factor for the current engine torque as a function of the representative wheel slip furnished by said device for wheel-selective slip value detection and for determining a representative wheel slip.

3. The circuit configuration according to claim 1, wherein vehicle parameters of the motor vehicle being ascertained continuously by model calculation are taken into account in the determination of the representative wheel slip for each wheel.

4. The circuit configuration according to claim 1, wherein said device for specifying a set-point slip determines a lower slip threshold and an upper slip threshold as a function of vehicle status variables.

* * * * *